(12) United States Patent
Cakmak et al.

(10) Patent No.: US 8,889,054 B2
(45) Date of Patent: Nov. 18, 2014

(54) HYBRID MANUFACTURING PLATFORM TO PRODUCE MULTIFUNCTIONAL POLYMERIC FILMS

(75) Inventors: Mukerrem Cakmak, Monroe Falls, OH (US); Darrell H. Reneker, Akron, OH (US); Baris Yalcin, Akron, OH (US)

(73) Assignee: The University of Akron, Akron, OH (US)

( * ) Notice: Subject to any disclaimer, the term of this patent is extended or adjusted under 35 U.S.C. 154(b) by 1326 days.

(21) Appl. No.: 12/090,437

(22) PCT Filed: Oct. 17, 2006

(86) PCT No.: PCT/US2006/040529
§ 371 (c)(1),
(2), (4) Date: Jul. 25, 2008

(87) PCT Pub. No.: WO2007/047662
PCT Pub. Date: Apr. 26, 2007

(65) Prior Publication Data
US 2009/0020921 A1    Jan. 22, 2009

Related U.S. Application Data

(60) Provisional application No. 60/727,347, filed on Oct. 17, 2005, provisional application No. 60/786,132, filed on Mar. 27, 2006.

(51) Int. Cl.
| | |
|---|---|
| *B29C 39/18* | (2006.01) |
| *B29C 41/30* | (2006.01) |
| *B29C 39/14* | (2006.01) |
| *D01D 5/00* | (2006.01) |
| *B29C 70/50* | (2006.01) |
| *B32B 5/30* | (2006.01) |
| *B32B 27/02* | (2006.01) |
| *B32B 27/12* | (2006.01) |
| *B32B 27/14* | (2006.01) |

(52) U.S. Cl.
CPC .............. *B29C 39/14* (2013.01); *D01D 5/0023* (2013.01); *D01D 5/003* (2013.01); *B29C 70/50* (2013.01); *B32B 5/30* (2013.01); *B32B 27/02* (2013.01); *B32B 27/12* (2013.01); *B32B 27/14* (2013.01); *D01D 5/0084* (2013.01)
USPC ................... 264/465; 264/171.1; 264/172.19; 264/216; 264/331.21

(58) Field of Classification Search
USPC ............. 264/171.1, 172.19, 465, 216, 331.21
See application file for complete search history.

(56) References Cited

U.S. PATENT DOCUMENTS 3,168,605 A * 2/1965 Ellegast et al. ........... 264/216 X
3,622,422 A * 11/1971 Newman .................... 156/309.6
(Continued)

FOREIGN PATENT DOCUMENTS

WO    WO01/26610 A1    4/2001
WO    WO 03/086234 A2 * 10/2003

*Primary Examiner* — Leo B Tentoni
(74) *Attorney, Agent, or Firm* — Renner Kenner Greive Bobak Taylor & Weber (57) ABSTRACT

The present invention relates to a method for producing hybrid materials of thin polymer films with single, laminated, complete and/or partially embedded nanofibers to obtain products with unique functional properties. In one embodiment, the present invention involves a method that comprises the combination of two process technologies; a thin film solution casting process (tape casting, solvent casting) and an electrospinning process, in order to produce hybrid materials of thin polymer films with single, laminated, completely and/or partially embedded electrospun nanofibers to obtain products with unique functional properties. In another embodiment of the present invention, fibers and/or nanofibers of a chosen material are spun directly on to substrates of polymer solutions and/or monomers solutions, were such solutions are located on a carrier belt that is electrically and/or ionically conductive.

16 Claims, 11 Drawing Sheets

(56) References Cited

U.S. PATENT DOCUMENTS

| | | |
|---|---|---|
| 4,043,331 A | 8/1977 | Martin et al. |
| 4,604,319 A * | 8/1986 | Evans et al. ............. 442/164 |
| 4,687,611 A * | 8/1987 | Sroog ............. 264/331.21 X |
| 4,878,908 A | 11/1989 | Martin et al. |
| 6,382,526 B1 | 5/2002 | Reneker et al. |
| 6,520,425 B1 | 2/2003 | Reneker et al. |
| 6,695,992 B2 | 2/2004 | Reneker et al. |
| 6,753,454 B1 | 6/2004 | Smith et al. |
| 2003/0106294 A1* | 6/2003 | Chung et al. ............. 55/486 |
| 2003/0195611 A1 | 10/2003 | Greenhalgh et al. |
| 2005/0104258 A1 | 5/2005 | Lennhoff |
| 2006/0003568 A1* | 1/2006 | Choi et al. ............. 438/610 |
| 2007/0144124 A1* | 6/2007 | Schewe et al. ............. 55/487 |

* cited by examiner

HYBRID MANUFACTURING PLATFORM TO PRODUCE MULTIFUNCTIONAL POLYMERIC FILMS

FIELD OF THE INVENTION

The present invention relates to a method for producing hybrid materials of thin polymer films with single, laminated, complete and/or partially embedded nanofibers to obtain products with unique functional properties. In one embodiment, the present invention involves a method that comprises the combination of two process technologies; a thin film solution casting process (tape casting, solvent casting) and an electrospinning process, in order to produce hybrid materials of thin polymer films with single, laminated, completely and/or partially embedded electrospun nanofibers to obtain products with unique functional properties. In another embodiment of the present invention, fibers and/or nanofibers of a chosen material are spun directly onto substrates of polymer solutions and/or monomers solutions, where such solutions are located on a carrier belt that is electrically and/or ionically conductive.

BACKGROUND OF THE INVENTION

The solution casting process of thin polymer films (also known as tape casting or band casting in the industry) involves spreading of a solution by a slot die, doctor blade or a reverse roll onto a carrier followed by subsequent removal of the solvent by the application of heat. Films ranging from several hundreds of microns thick to a couple of microns can be produced with extreme uniformity. Solution casting processes offer advantages for materials that cannot be melt processed or exhibit melt instabilities at small thickness ranges. Commercial solution casting machines have been manufactured for over five decades and come in a wide variety of designs. Commercial solution casting machines typically include a solid casting surface, a drying chamber with a built in means of controlling the airflow over the cast solution, an adjustable speed carrier drive control, an air heater to control the temperature of the filtered feed air to the drying chamber and under-bed heaters to set-up the desired temperature profile in the machine. The carrier is usually a rotating endless stainless steel belt, although other common polymeric or coated paper carriers are also found in industrial applications. This endless steel belt may also include under-bed heaters to conductively heat the cast medium from below. By the combined effect of air heating from above and conductive heating from below the cast fluid or partially fluid medium, the solidification through the removal of solvent and/or polymerization can be affected. Multiple carriers in a single solution casting machine are also possible.

The technique of electrospinning, also known within the fiber forming industry as electrostatic spinning, of liquids and/or solutions capable of forming fibers, is well known and has been described in a number of patents as well as in the general literature. The process of electrospinning generally involves the creation of an electrical field at the surface of a liquid. The resulting electrical forces create a jet of liquid which carries an electrical charge. These electrically charged jets of liquid may be attracted to a body or other object at a suitable electrical potential. As the liquid jet is forced farther and farther toward the object, it elongates. As it travels away from the liquid reservoir, it steadily dries and hardens, thereby forming a fiber. The drying and hardening of the liquid jet into a fiber may be caused by cooling of the liquid (i.e., where the liquid is normally a solid at room temperature); evaporation of a solvent (e.g., by dehydration); physically induced hardening; or by a curing mechanism (chemically induced hardening). The fibers produced by electrospinning techniques are collected on a suitably located charged receiver and subsequently removed from the receiver as needed.

Fibers produced by the electrospinning process have been used in a wide variety of applications and are known from, for example, U.S. Pat. Nos. 4,043,331 and 4,878,908, to be particularly useful in forming non-woven mats suitable for use in wound dressings. Other medical applications include drug delivery (see, e.g., U.S. Published Patent Application No. 2003/0195611), medical facemasks (see, e.g., WO 01/26610), bandages and sutures that minimize infection rate, blood loss and ultimately dissolve into body. Nanofibers also have promising applications in the area of filtration due to their smaller microporous structure with higher surface area. Electrospun nanofibers are ideal for filtering submicron particles from air or water. They improve filter life and have more contaminant holding capacity.

SUMMARY OF THE INVENTION

The present invention relates to a method for producing hybrid materials of thin polymer films with single, laminated, complete and/or partially embedded nanofibers to obtain products with unique functional properties. In one embodiment, the present invention involves a method that comprises the combination of two process technologies; a thin film solution casting process (tape casting, solvent casting) and an electrospinning process, in order to produce hybrid materials of thin polymer films with single, laminated, completely and/or partially embedded electrospun nanofibers to obtain products with unique functional properties. In another embodiment of the present invention, fibers and/or nanofibers of a chosen material are spun directly onto substrates of polymer solutions and/or monomers solutions, where such solutions are located on a carrier belt that is electrically and/or ionically conductive.

Therefore, it is an object of the present invention to provide methods for integrating electrospinning platforms on commercial solution casting machines in order to fabricate multilayer composite structures of thin polymer films comprising a solution-cast base with one or more layers of electrospun fibers and/or nanofibers embedded and/or coated on such a base layer.

It is yet another object of the present invention to describe how solutions are electrospun onto a cast film that is, in one embodiment, located on a carrier belt of a commercial solution casting machine to create multilayer structures.

It is another object of the present invention to provide possible application areas for these products.

It is still another object of the present invention to provide a continuous process for the mass production of the proposed multilayer films or as-spun nanofiber webs.

In one embodiment, the present invention relates to a method for producing a nanofiber-polymer film combination, the method comprising the steps of: (A) producing a polymer film, wherein the polymer film is receptive to one or more layers of nanofibers; (B) depositing one or more layers of nanofibers on the polymer film.

In another embodiment, the present invention relates to a method for producing a nanofiber-polymer film combination, the method comprising the steps of: (a) producing a polymer film, wherein the polymer film is receptive to one or more layers of nanofibers; (b) subjecting the polymer film to at least one heating zone; (c) depositing one or more layers of nanofibers on the polymer film.

BRIEF DESCRIPTION OF THE DRAWINGS

FIGS. 11(a) and 11(b) are dark field optical microscope (OM) images of scratched surfaces of polyethylene oxide (PEO) nanofibers in a poly(amic acid) (PAA) film, where FIG. 11(a) is an image of fibers that are embedded into the poly(amic acid) (PAA) film, and where FIG. 11(b) is an image of fibers that are surface coated onto a poly(amic acid) (PAA) film.

DETAILED DESCRIPTION OF THE INVENTION

The present invention relates to a method for producing hybrid materials of thin polymer films with single, laminated, complete and/or partially embedded nanofibers to obtain products with unique functional properties. In one embodiment, the present invention involves a method that comprises the combination of two process technologies; a thin film solution casting process (tape casting, solvent casting) and an electrospinning process, in order to produce hybrid materials of thin polymer films with single, laminated, completely and/or partially embedded electrospun nanofibers to obtain products with unique functional properties. In another embodiment of the present invention, fibers and/or nanofibers of a chosen material are spun directly onto substrates of polymer solutions and/or monomers solutions, where such solutions are located on a carrier belt that is electrically and/or tonically conductive.

As used herein the term nanofiber refers to fibers having an average diameter in the range of about 1 nanometer to about 25,000 nanometers (25 microns). In another embodiment, the nanofibers of the present invention are fibers having an average diameter in the range of about 1 nanometer to about 10,000 nanometers, or about 1 nanometer to about 5,000 nanometers, or about 3 nanometers to about 3,000 nanometers, or about 7 nanometers to about 1,000 nanometers, or even about 10 nanometers to about 500 nanometers. In another embodiment, the nanofibers of the present invention are fibers having an average diameter of less than 25,000 nanometers, or less than 10,000 nanometers, or even less than 5,000 nanometers. In still another embodiment, the nanofibers of the present invention are fibers having an average diameter of less than 3,000 nanometers, or less than about 1,000 nanometers, or even less than about 500 nanometers. Additionally, it should be noted that here, as well as elsewhere in the text, ranges may be combined.

In one embodiment of the present invention the aforementioned two technologies, i.e. solution casting and electrospinning technology, are combined in order to fabricate multilayered polymer structures comprising a base of liquid and one or more layers of spun fibers and/or nanofibers that are positioned in and/or on the liquid layer. The nanofibers can have a chemical composition that is the same or different from the liquid base layer. In another embodiment, the nanofibers can have a chemical composition that is the same or different from the solute material that is used in the base layer. In one instance, the nanofiber material should be either insoluble or have limited solubility in the solvent used for solution casting the base film.

The one or more spun layers are, in one embodiment, partially or fully embedded in the fluid medium that forms the liquid base layer. The fluid base layer may or may not have chemical or physical interaction with the material making up the electrospun nanofibers. Through a variety of chemical and/or physical means, strong bonds can be easily established between the cast base material and the electrospun fibers and/or nanofibers. In one embodiment, the base layer material can be a polymer solution or a monomer that is ready to be polymerized by a variety of polymerization methods, including photo-polymerization, etc.

Combining the afore-mentioned two technologies is practical and useful not only for fabricating the said multilayered thin polymer film but also for improved control over the electrospinning process. Standard electrospinning set-ups generally do not include capabilities for controlling the electrospinning medium (typically air) temperature, pressure and solvent concentration. Health and safety concerns are important to consider, since the vapors emitted from electrospinning solution can be hazardous upon inhalation and should be recovered and disposed of accordingly. Furthermore, challenges still remain to scale up the electrospinning process to continuous mass production while reducing the high cost of the technology. Most of these problems can be eliminated once the electrospinning process is integrated with the solution casting process. Therefore, there is a need for a method that combines at least these two technologies.

The present invention also permits the integration of the afore-mentioned technologies, thereby yielding improved control of the processing conditions in electrospinning with an eye towards better product uniformity and mass production in a continuous fashion.

As noted hereinabove, in one embodiment the present invention is directed to the production of multilayer thin polymer films comprising a solution-cast base layer and one or more successive layers of electrospun nanofibers of same or varying chemical composition. In another embodiment, the present invention is directed to the production of multilayer thin polymer films comprising a solution-cast (liquid reacting or non-reacting) base layer and electrospun nanofibers either in multilayer configuration or partially or fully embedded form or as one or more successive layers on the base film.

In order to produce the proposed composite structures, the nanofibers can, in one embodiment, be spun directly on a cast polymer solution and/or monomer on a rotating endless steel conveyor belt of a solution casting machine or on a conductive carrier film being transported along the steel conveyor belt.

In the embodiment involving direct casting on the steel belt, the grounded receiver would be the conductive steel conveyor belt and the charged liquid would be dispensed from syringes directed towards the conveyor belt of the solution casting machine. One possible apparatus 100 for carrying out the present invention is shown in FIG. 1.

Figure 1:
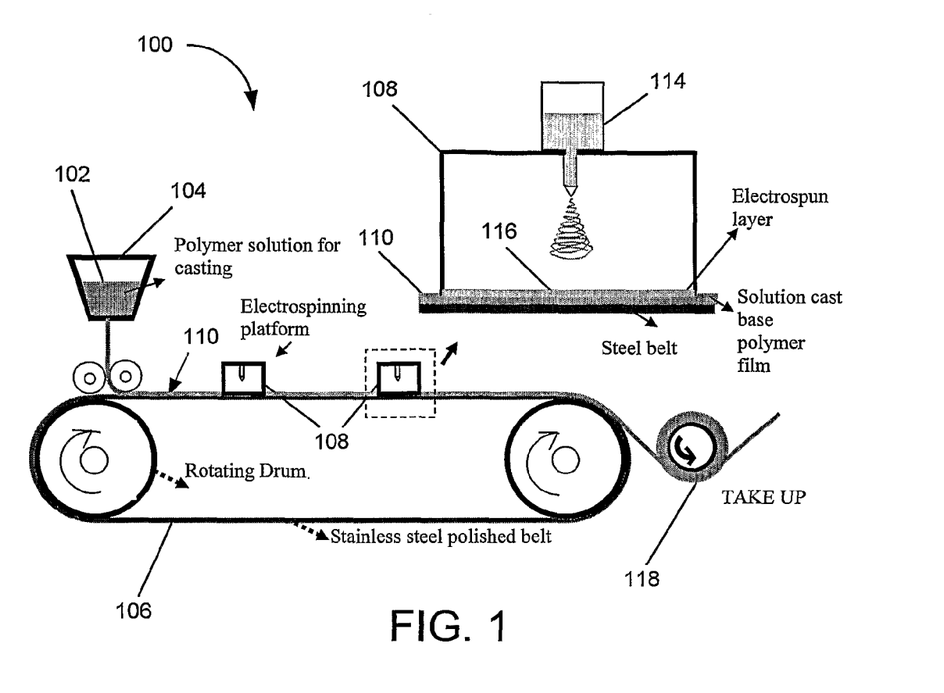
FIG. 1 is an illustration of a production apparatus for producing multi-functional polymer films in accordance with one embodiment of the present invention.

In the embodiment of FIG. 1, apparatus 100 according to one embodiment of the present invention, comprises a polymer solution 102, for casting, that is contained in any suitable container 104. Polymer solution 102 is first cast onto a moving carrier belt 106 of solution casting apparatus 100. Optionally, carrier belt 106 can next go through one or more heating zones (not shown) for facilitating solvent evaporation. The heating zones can be formed by any suitable device that can provide localized heat to one or more areas of the solution cast polymer. For example, the heating zones could be formed as heating chambers (e.g., small semi-closed boxes that are kept at one or more elevated temperatures.

Next, as can be seen from FIG. 1, one or more electrospinning platforms 108 are built on solution casting apparatus 100 in order to permit for the spinning of one or more nanofibers onto a solution cast base polymer layer and/or film 110. The nanofibers of the present invention are spun from a suitable nanofiber material 112. The process is finalized by the removal of the solvent from a film 114 thereby rendering dry hybrid materials comprising a uniform thin base film layer 110 with electrospun fibrous surface structures 116 which can be, for example, collected on an uptake 118. Opportunities for forming multilayered structures using this process are unlimited. If different polymer/solvent mixtures are employed for solution casting and electrospinning, one can manufacture hybrid polymer films with different layers of polymers and morphologies along the thickness direction. If a single polymer/solvent mixture is used in the process, multiple layers of the same polymer with different morphologies, i.e. uniform thin film and fibrous top layers, will be formed along the thickness direction of the film.

If the polymer used for solution casting is non-conductive (i.e., non-conductive in the electrical sense), as it is typical for most polymers, it is possible to spin the nanofibers on the solution cast film before all the solvent is evaporated. This can be accomplished, in one instance, by spinning the nanofibers on the cast polymer solution prior to entering the major heated zones of the solution casting machine. This set-up/process order ensures that the receiving steel belt remains conductive. This also helps the nanofibers adhere to the layers preceding them. It is also possible to apply the nanofibers on the solution cast film while the film is passing through a set of heating chambers before all the solvent is evaporated.

Since most commercial solution casting machines are designed as completely enclosed systems, it is ideal to have removable access top panels for integration with the electrospinning process. Portable electrospinning platforms can replace these top panels wherever and whenever desired. At times when electrospinning is not desired, and the solution casting machine is to be used for casting thin films only, electrospinning platforms will be removed and top panels are put back into their original locations. It is important that once the electrospinning platforms are in place, they should seal off the machine chamber.

While the present invention is not limited to just one layout, an electrospinning platform will typically accommodate a high voltage source, a high precision pressure/vacuum air pump, one or more large-capacity, air-sealed spinnerets (e.g., a syringe), connected to the pressure/vacuum pumps with flexible tubes and one or more controllers for setting pressure and vacuum levels in the spinnerets. The spinneret is, in one embodiment, mounted on a translation stage (e.g., a linear actuator) which is mounted on the platform. The translation stage allows the spinneret to move horizontally along the width of the carrier belt for positioning the nanofibers uniformly along the width direction of the cast film. The horizontal movement of the translation stage is, in one embodiment, controlled by a laser micrometer. The capability to control pressure/vacuum levels in the spinnerets are, in one embodiment, one important factor of the present invention.

Since the spinnerets are positioned vertical to the carrier belt, dripping of the solution from the syringe needles should be prevented. This can be accomplished by adjustment of the pressure/vacuum levels in the spinnerets throughout the process via any suitable control means. Thus, the present invention may include any suitable control means that permits an operator to control pressure/vacuum levels in the one or more spinnerets. In one embodiment, this control means can be a pressure regulator that is either manually or automatically adjusted (e.g., by a computer control system). If the solution drips from the syringe needle, a vacuum is initially applied to stop the dripping. This is followed by the application of sufficient amount of air pressure to the solution to allow it to spin without dripping. If a sufficient air pressure is not applied to the solution after the initial vacuum, the solution would stop spinning after a while since a vacuum would be generated in the sealed syringe due to the removal of the solution by spinning. As would be known to those of skill in the art, the solution is dispensed at a higher rate under higher voltage. In such a case, the air pressure should also be increased. The force balance acting on the solution in the electrospinning process, (e.g., electrical forces, surface tension, gravity) can be adjusted to render the process dripless by adjusting the pressure/vacuum levels in the sealed spinneret.

In one embodiment, the platform has vertical (z-direction) translation capability. This is desirable because the distance needed between the spinneret and the carrier belt is influenced by the drying rate of the polymer solution. As would be known to those of skill in the art, the drying rate would be different for different polymer/solvent systems. Vertical height adjustment capability of the electrospinning platform allows for a height adjustment between the spinneret and the carrier belt which in turn permits the spinning of different polymer/solvent systems simultaneously at various positions along the length of the device of the present invention. In one embodiment, multiple spinnerets, numbering from 2 to about 1000, can be used in order to increase the production rate. The single die containing multiple needles or small capillaries are connected to the pressure and vacuum pump in order to prevent dripping of the solution.

Figure 2:
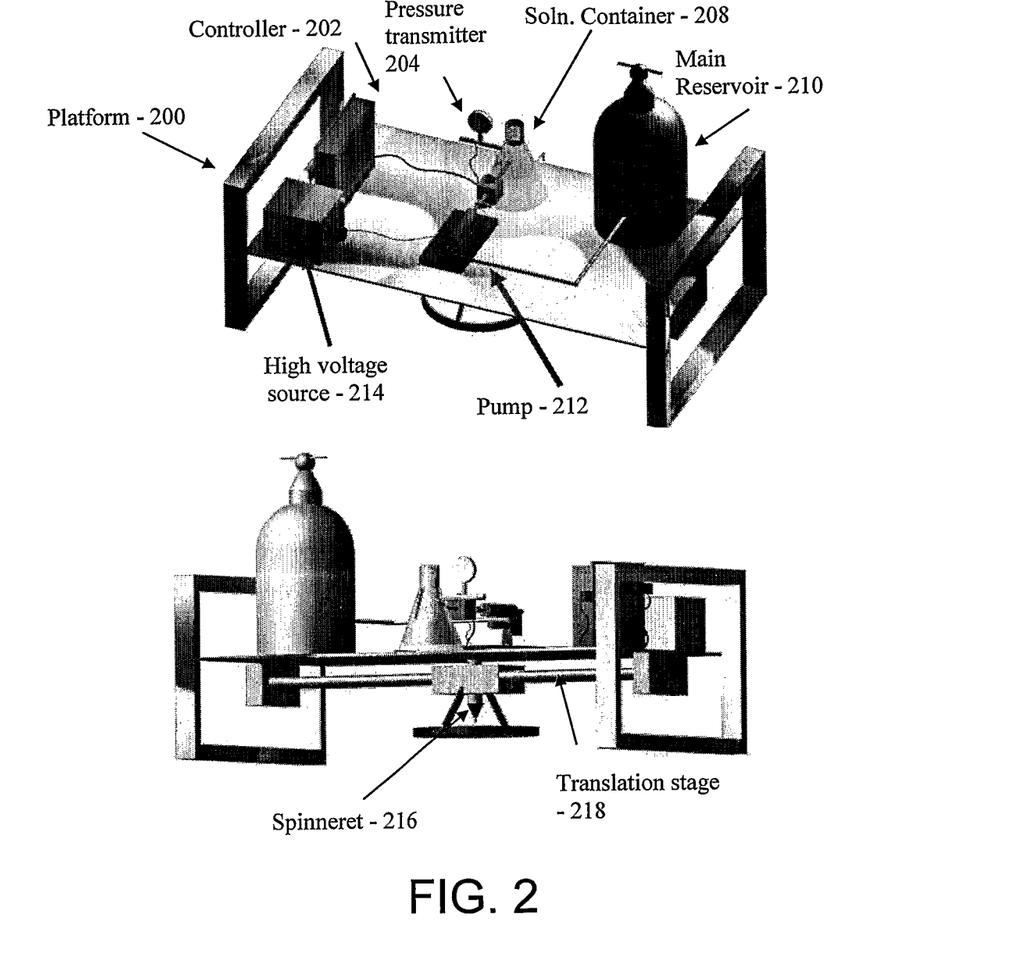
FIG. 2 illustrates two views of an electrospinning platform that can be utilized in conjunction with the present invention.

FIG. 2 shows an example electrospinning platform according to one embodiment of the present invention with a single nanofiber deposition capability. In the embodiment of FIG. 2, an exemplary electrospinning platform 200 is illustrated which comprises a controller 202, a pressure transmitter 204, a solution container 208 for containing a suitable solution to be electrospun, a main reservoir 210, a pump 212, and a high voltage source 214. As can be seen in the alternative view of platform 200 in FIG. 2, the bottom of platform 200 comprises a spinneret 216 and a translation stage 218. Translation stage 218 permits for movement of spinneret 216 in at least a two-dimensional manner.

Figure 3:
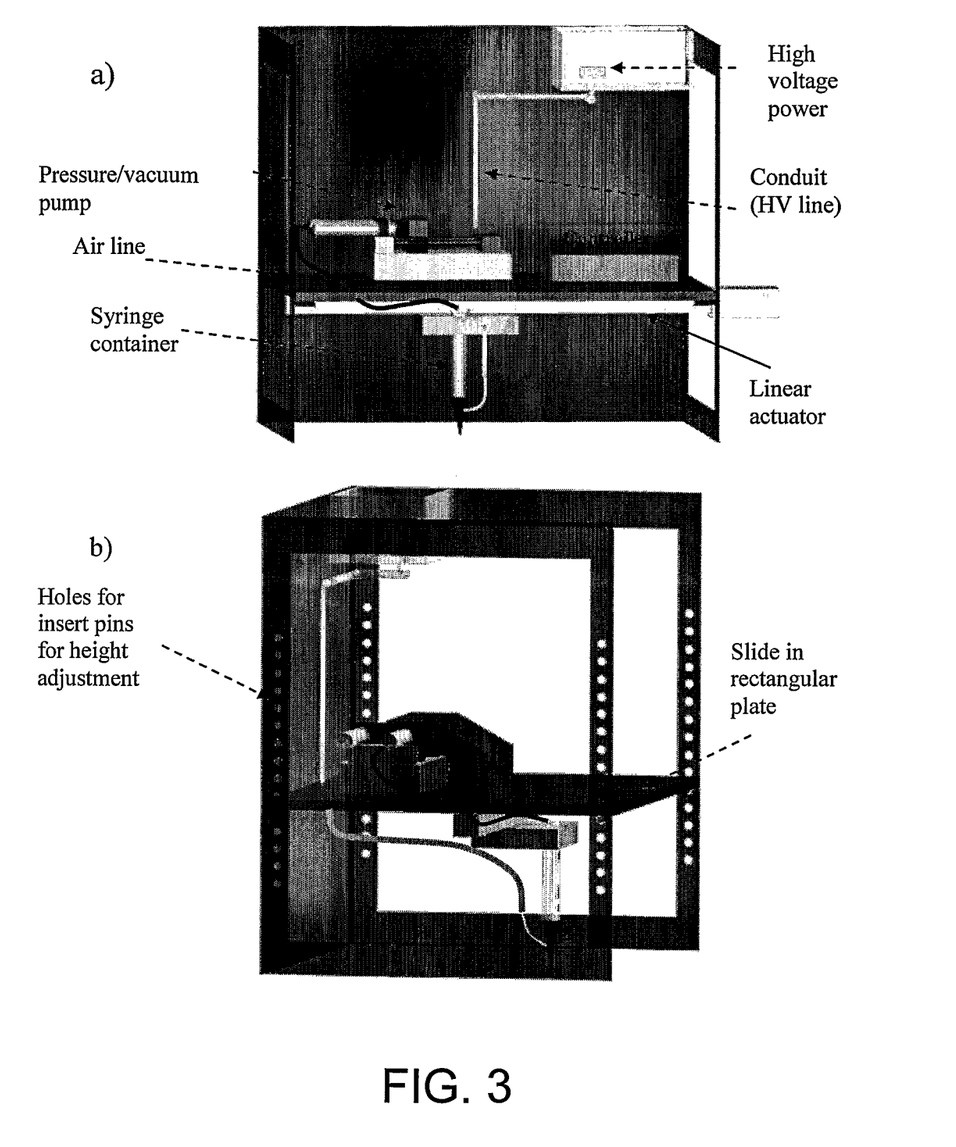
FIGS. 3(a) and 3(b) illustrate two additional views of another embodiment of an electrospinning platform that can be utilized in conjunction with the present invention.

It should be noted that the present invention is not just limited to embodiment where a single nanofiber is deposited. Rather, electrospinning platforms with the capability of depositing one or more nanofibers can be utilized in the present invention. Electrospinning platforms shown in FIG. 2 have open sides for illustration purpose only. In reality, the platforms should be sealed at all sides and should seal off the solution casting machine from the ambient atmosphere when they are in use. FIGS. 3(a) and 3(b) illustrate two additional views of another embodiment of an electrospinning platform that can be utilized in conjunction with the present invention. Again, the electrospinning platforms shown in FIGS. 3(a) and 3(b) have open sides for illustration purpose only. In reality, the platforms should be sealed at all sides and should seal off the solution casting machine from the ambient atmosphere when they are in use.

Figure 4:
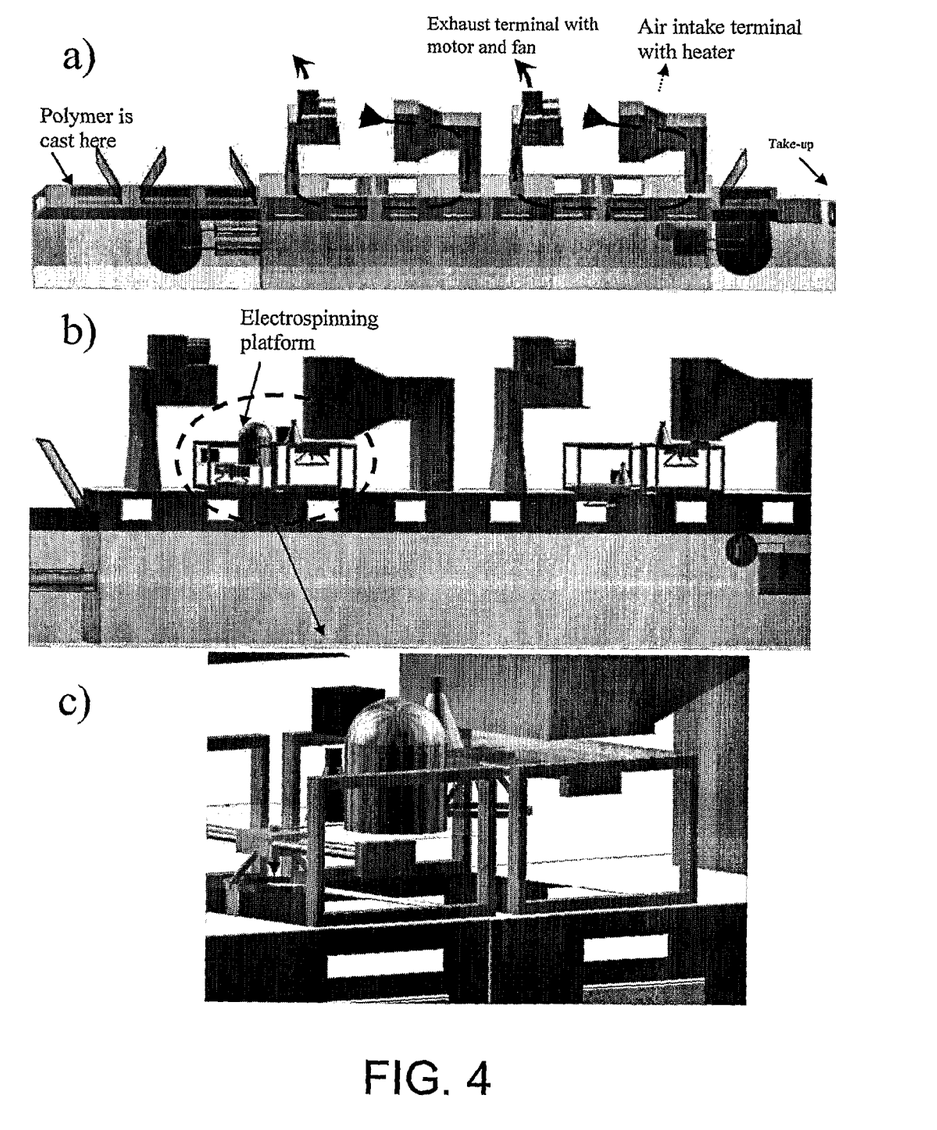
FIG. 4(a) illustrates a solution casting machine without an electrospinning portion.
FIG. 4(b) illustrates a solution casting machine in accordance with the embodiment of FIG. 4(a), the solution casting machine having at least two electrospinning platforms of the type depicted in FIG. 2.
FIG. 4(c) is an enlarged view of the dashed circle of FIG. 4(b)
Figure 5:
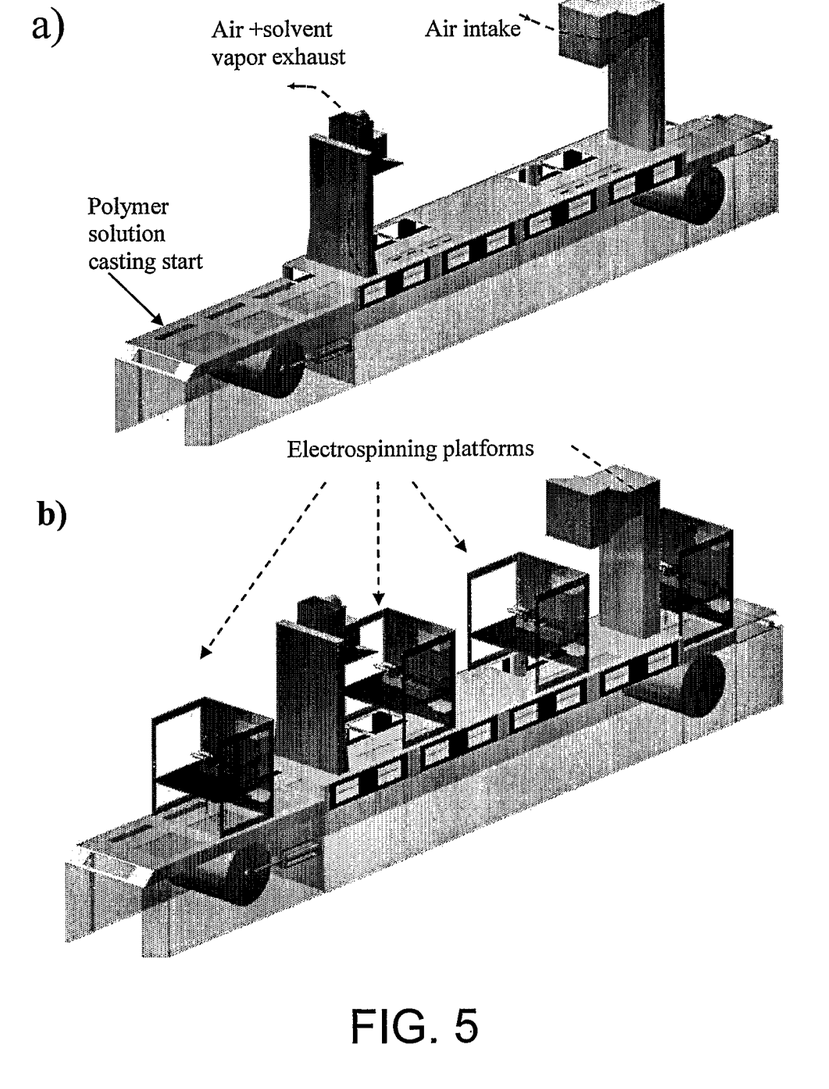
FIG. 5(a) illustrates another embodiment of a solution casting machine without an electrospinning portion.
FIG. 5(b) illustrates a solution casting machine in accordance with the embodiment of FIG. 5(a), the solution casting machine having at least four electrospinning platforms of the type depicted in FIGS. 3(a) and 3(b)

Solution casting machines offer a practical solution and provide a platform for continuous production of webs of nanofibers directly on the rotating carrier belts or on the cast polymer solutions for creating hybrid multilayered film structures. FIGS. 4(a), 4(b) and 4(c) are illustrations of a commercial solution casting machine and an integrated version according to the present invention using multiple electrospinning platforms according to the embodiment of FIG. 2. FIGS. 5(a) and 5(b) are illustrations of a commercial solution casting machine and an integrated version according to the present invention using multiple electrospinning platforms according to the embodiment of FIGS. 3(a) and 3(b).

There are many adjustable process variables of the solution casting process that could be useful for better control of the electrospinning process. For instance, the temperature of the inlet air and under-bed heaters is adjustable—facilitating temperature profiling along the length of the machine. The ability to control the air temperature is important for electrospinning since temperature of the air influences the drying behavior of the nanofibers. By raising the air inlet temperature, it is possible to reduce the distance between the spinneret and the receiver carrier belt. FIG. 4(a) illustrates a solution casting machine with a parallel air flow design over the carrier. Other designs utilizing air impingement drying or steam spray are also available commercially.

Another variable is the speed of the air over the carrier. An increase in air speed can also accelerate the drying of the nanofibers and facilitate fast removal of the solvent vapor from the environment. Usually, the solvent vapors in the exhaust air pass through an exhaust duct and are stripped off from the exhaust air by a solvent recovery unit. In addition, all commercial solution casting machines are equipped with Lower Explosion Level (LEL) sensors. These auxiliary capabilities of the solution casting process are important since most current electrospinning processes are carried out in open atmosphere and do not conform to health and/or safety standards.

Another advantage of using a solution casting carrier platform for electrospinning is the adjustable speed carrier drive control. This brings in a collection area motion capability to the electrospinning process. There are solution-casting machines used by the coatings industry that are up to 300 ft in length and can attain carrier speeds of from about 100 to about 1000 ft/min. These speeds are high enough to cause alignment of the nanofibers which is important for some applications. For such high speed applications, conductive polymer films can, in one embodiment, be used as carrier substrates and coated with aligned nanofibers. It is also possible to coat the top layers of very thin solution cast polymers with aligned nanofibers in high speed operation modes. In this mode of operation, the residence time would not be enough to spin the nanofibers on the cast solution before the solvent is evaporated. In such situations a very thin layer of liquid can be coated onto a carrier film, thus lowering the residence time requirements in the chamber. In another operational mode, the thickness of the dry polymer film, which can be about 2 to 3 microns, permits fibers and/or nanofibers to be spun on the dry film which is cast on the conductive carrier (steel, or a conductive polymer film) belt. In one embodiment, the belt can be rotated in an endless fashion until the desired electrospun layer thickness is achieved.

The present invention is capable of producing very thin nanofiber reinforced hybrid films. These films comprise a uniform polymer film layer that is coated with, or has embedded therein, one or more layers of fibers and/or nanofibers. While not limited thereto, the thickness of such films can, in one embodiment, range from a couple of micrometers to several hundreds of microns. Films made in accordance with the present invention could, for example, be used as solar sails for a spacecraft.

Additionally, the present invention makes it possible to render nonconductive polymer films conductive by embedding conductive polymer nanofibers in a nonconductive polymer film.

The hybrid films of the present invention could also be useful in manufacturing hybrid membranes comprising non-porous and nano-porous layers of different polymers and morphologies. Such materials are useful in areas of selective chemical reactivity, solid support catalysts, membrane supported smart materials, and membranes for immobilizing biological and pharmacologically active agents and molecules. In addition with a judicious choice of materials, surfaces exhibiting extreme hydrophobicity or hydrophilicity can be produced.

Returning to the discussion of the fiber and/or nanofiber structures made possible by the present invention, these fibrous structures can be embedded or simply reside on the surface of the film by adjusting material and process variables of both the electrospinning and solution casting process. The amount of solvent remaining in the cast target solution layer and the electrical potential difference between the electrospinning solution and the receiving target (e.g., a cast base solution layer) are, in one instance, important parameters. If the cast solution layer is mostly in the liquid form, i.e. no or very little solvent evaporates from the cast film, the fibers and/or nanofibers under the influence of an electrical field overcome the surface tension of the solution cast base film and penetrate into the film as much as the viscosity of the base film allows. If the nanofibers are spun on a solution cast target that has released most of its solvent, the fibers and/or nanofibers can not penetrate into the base layer and simply will reside on or in close proximity to the surface of the base film.

In addition, as the solvent evaporates from base target solution, the conductivity of the target decreases and the nanofibers travel slower towards the target due to unfavorable electrical potential conditions. The location of the electrospinning platforms along the casting line can, in some embodiments, be important in determining whether the nanofibers will be embedded or will simply reside on the surface of the target layer traveling underneath the electrospinning platform(s). Control of evaporation can also be used to develop gradient structures where the nanofibers may be placed at different depths in a thickness direction in the base film. This concept is possible by, in one instance, partially drying solution cast films before fibers and/or nanofibers are electrospun onto the films.

In one instance, a poly(amic acid) (PAA) in NMP solution is solution cast using a doctor blade set at 100 µm wet clearance. A number of films are made using this process and are let dry for 0, 10, 20, 25, 30 and 40 minutes before polyethylene oxide (PEO) nanofibers are electrospun from water onto the poly(amic acid) (PAA) in NMP solution cast films. The heating zones of the solution casting machine is set to 60° C. and the fans to 50% in order to facilitate remaining solvent removal. Dried films are investigated using scanning electron microscopy (SEM) and optical microscopy (OM). SEM images have a characteristic three-dimensional appearance and are useful for judging the surface structure of the films. If all the fibers are on the surface, SEM shows uniform well defined fibers. If the fibers are partially embedded, SEM shows bright and dark regions of fibers indicating slightly embedded and on-surface regions; respectively.

In another instance, if the fibers are embedded but still very close to the surface of the film, SEM can detect faint impressions of the fibers. If the nanofibers are embedded deep into the film, SEM cannot detect any fiber image. In such a case, optical microscopy, either in the transmission mode or dark and/or bright field reflection mode, can detect the nanofibers embedded in the film. Atomic force microscopy (AFM) is another characterization tool useful for characterizing the embedded fibers. The above-mentioned concept can be easily adapted to continuous operation by real time detection of the solvent concentration of the solvent in the traveling film and by control of temperature of the carrier from below (conduction) and from above(convection) the desired concentration in the film can be achieved underneath the electrospinning platform(s). This will make continuous nano-manufacturing possible.

Figure 6:
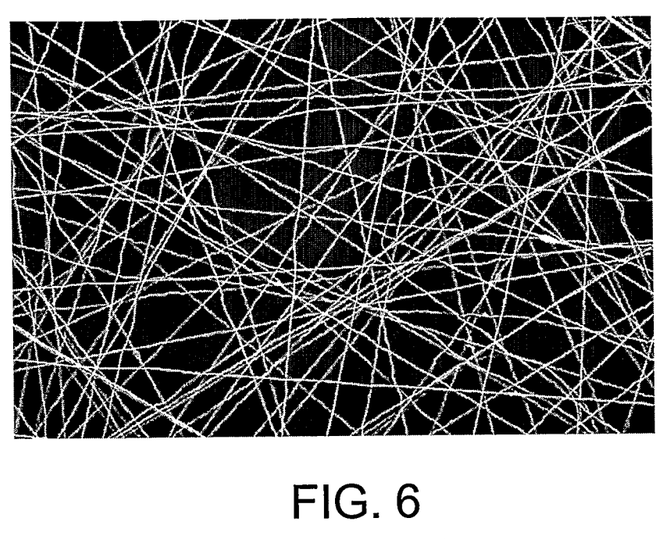
FIG. 6 is a scanning electron microscope (SEM) image of polyethylene oxide (PEO) nanofibers coated onto the surface of a poly(amic acid) (PAA) film.
Figure 7:
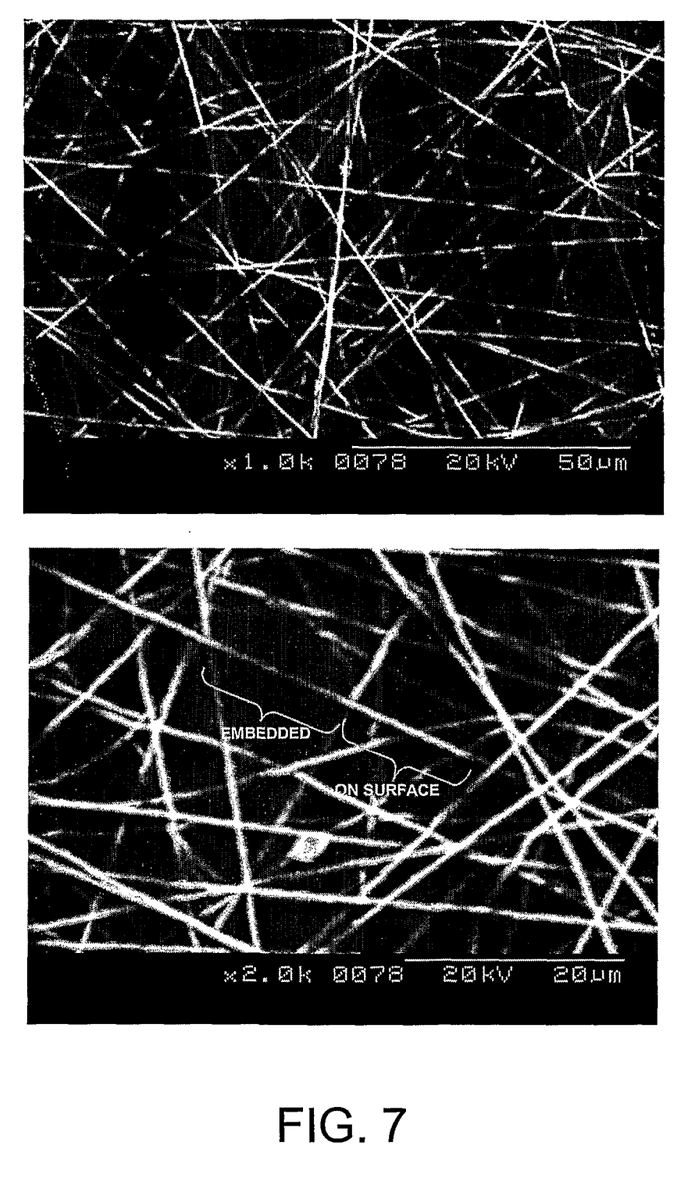
FIG. 7 are scanning electron microscope (SEM) images of polyethylene oxide (PEO) nanofibers partially embedded into a poly(amic acid) (PAA) film.

FIG. 6 is a scanning electron microscope (SEM) image of polyethylene oxide (PEO) nanofibers coated onto the surface of a poly(amic acid) (PAA) film. Specifically, FIG. 6 shows well defined nanofibers with uniform brightness and contrast on the surface of a solution cast film dried for 40 minutes before electrospinning. FIG. 7 are scanning electron microscope (SEM) images of polyethylene oxide (PEO) nanofibers partially embedded into a poly(amic acid) (PAA) film. Specifically, the images of FIG. 7 show nanofibers on the surface of a solution cast film dried for 30 minutes before electrospinning. The fibers are still apparent but with dark and bright regions indicating partial embedding.

Figure 8:
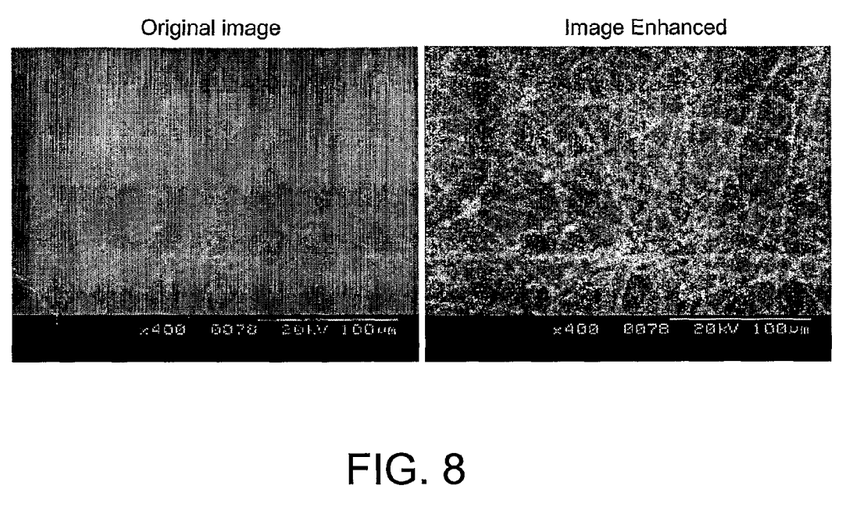
FIG. 8 are scanning electron microscope (SEM) images of polyethylene oxide (PEO) nanofibers fully embedded into a poly(amic acid) (PAA) film but residing very close to the surface.

FIG. 8 are scanning electron microscope (SEM) images of polyethylene oxide (PEO) nanofibers fully embedded into a poly(amic acid) (PAA) film but residing very close to the surface. Specifically, the images of FIG. 8 show faint impressions of fibers which are fully embedded but still close enough to the surface to be detected by SEM. Nanofibers are not generally found on the surface of the films dried for 0, 10 and 20 minutes before electrospinning. This is because the nanofibers are not on the surface but embedded deep into the film and the fibers and/or nanofibers cannot be seen by SEM as it is sensitive to surface topology.

Figure 9:
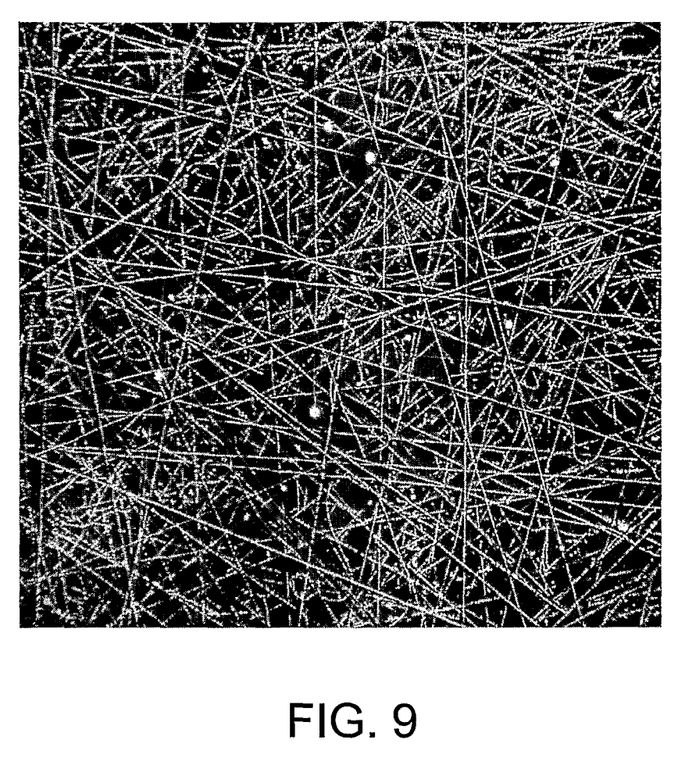
FIG. 9 is a dark field optical microscope (OM) image of polyethylene oxide (PEO) nanofibers fully and deeply embedded into a poly(amic acid) (PAA) film.
Figure 10:
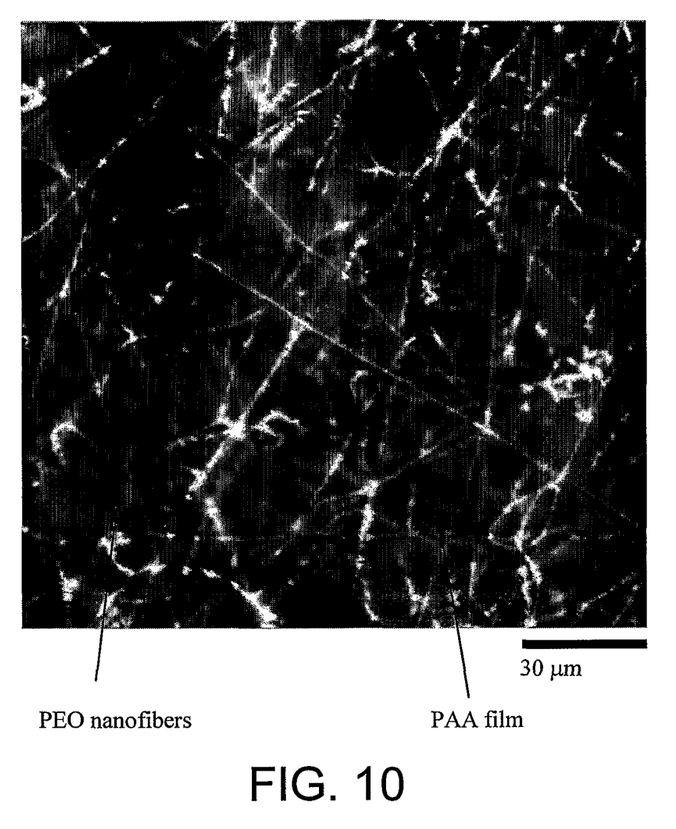
FIG. 10 is an atomic force microscope (AFM) image of polyethylene oxide (PEO) nanofibers fully and deeply embedded into a poly(amic acid) (PAA) film.

FIG. 9 is a dark field optical microscope (OM) image of polyethylene oxide (PEO) nanofibers fully and deeply embedded into a poly(amic acid) (PAA) film, and FIG. 10 is an atomic force microscope (AFM) image of polyethylene oxide (PEO) nanofibers fully and deeply embedded into a poly(amic acid) (PAA) film. OM and AFM, on the other hand, reveal the presence of the embedded fibers as shown in FIGS. 9 and 10, respectively.

Figure 11:
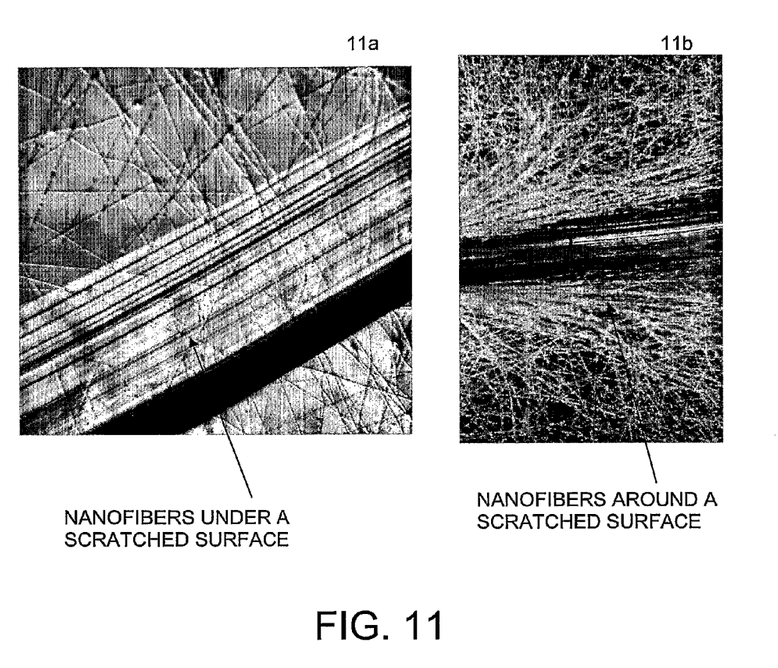

Another method of assessing whether the nanofibers are simply coated on the surface of a film or embedded deep into the film is by making physical disturbance such as rubbing onto the film surface or scratching. Fibers that are embedded show no change in their positional arrangement after surface rubbing or slight scratching. Fibers that are coated onto the surface, on the other hand, are disturbed by such a physical interference. FIGS. 11(a) and 11(b) are dark field optical microscope (OM) images of scratched surfaces of polyethylene oxide (PEO) nanofibers in a poly(amic acid) (PAA) film, where FIG. 11(a) is an image of fibers that are embedded into the poly(amic acid) (PAA) film, and where FIG. 11(b) is an image of fibers that are surface coated onto a poly(amic acid) (PAA) film.

The electrical potential difference between the electrospinning solution and the receiving target determines how strongly the nanofibers will impinge onto the base liquid layer. Increasing the electrical potential between the electrospinning solution and the base liquid target will facilitate fiber and/or nanofiber penetration into the solution layer. On the other hand, nanofibers can be placed gently on the base liquid target by adjusting the electrical potential difference between the solution and the target.

The nature of the cast solution and electrospun fibers (viscosity, surface tension, etc.) is one controlling factor for embedding or coating of the films with nanofibers. Depending on the surface tension, the cast-solution may exhibit resistance to the welting of the fiber and hence penetration of the fiber into the film. If different polymer/solvent mixtures are employed for solution casting and electrospinning, one can manufacture hybrid polymer films with different layers of polymers and morphologies along the thickness direction. If a single polymer is used in the process, multiple layers of the same polymer with different morphologies, i.e. uniform thin film and fibrous structures, can be formed along the thickness direction of the film. However, the solvent used for film casting should be chosen so that it does not dissolve the fiber.

Due to the present invention, applications where it is desirable to control surface friction properties via the control of chemical and physical attributes of the films with embedded nanofibers, can be obtained. In another application one can create electro-active structures where the nanofiber orientation with respect to the embedded plane can be altered by electrical means. This will offer active control of surface properties of the materials.

In another application, protrusions of nanofibers can be formed and such protrusions may/can be used to dissipate heat from the main body of structures attached to a conductive (electrical and/or thermal) film on which they are embedded. In another application the application of nanofibers can be used in membrane applications where selective separation of certain chemical species is desired. In another application, the nanofibers can be immobilized on a substrate and these structures can be used as catalysts when the nanofibers are embedded, coated and/or impregnated with one or more appropriate inorganic or organic compounds.

In another application the membranes needed to construct the fuel cells can be produced by this hybrid process. Proton conducting membranes reinforced with nanofibers could help with high temperature conductivity problems. The porous nature of such membranes would also help with the wetting of the membrane and its water retention.

Using the present invention, it is possible to form physical and chemical protective layers on thin solvent cast films used for commodity or high technology applications. These films will be very light in weight.

Due to the present invention, a solution cast film can serve as a substrate for holding electrospun nanofiber webs. This is important for integrating photonics into textiles and clothing. Wearable photonics such as fiber optic sensors and integrated smart textile structures and the developments in various flexible photonic display technologies as well as current communication apparel and optical fiber fabric displays will benefit from this technology.

The present invention could also be used to produce photonic structures and/or yield an improved method for the fabrication of such structures. In one such instance, the present invention could be used in whole, or in part, to produce arrays of tiny coils arranged to make a structure with negative dispersion at useful frequencies. The useful frequency range can be chosen by adjusting the dimensions of the coils. The negative dispersion material interacts with one of the circularly polarized photons, while the opposite circular polarization does not interact. The coils can be coated with metals, either completely or partially, to provide electrical conductivity or polarizability. Such coils can be made by utilization of the electrically driven bending instability of an electrospinning jet. In such a case, the present invention permits the creation of a substrate in the form of a cast sheet, which can hold the coils in useful orientations, i.e. at optimal angles and spacings in three-dimensional space, on the sheet.

In another embodiment, the fibers and/or nanofibers used in the present invention can be made by other suitable methods. Such methods include, but are not limited to, wet spinning, dry spinning, melt spinning, gel spinning and nanofibers by gas jet (NGJ). As mentioned above, electrospinning is particularly suitable for fabricating fibers of the present invention inasmuch as it tends to produce the thinnest (i.e., finest denier) fibers of any of the foregoing methods. Electrospinning techniques are described in U.S. Pat. Nos. 4,043,331; 4,878,908; and 6,753,454, which are hereby incorporated by reference in their entireties.

Another particularly effective method for producing nanofibers of the present invention comprises the nanofibers by gas jet method (i.e., NGJ method). Techniques and apparatuses for forming fibers via NGJ are described in U.S. Pat. Nos. 6,382,526; 6,520,425; and 6,695,992, which are hereby incorporated by reference in their entireties.

Briefly, the method comprises using a device having an inner tube and a coaxial outer tube with a sidearm. The inner tube is recessed from the edge of the outer tube thus creating a thin film-forming region. Polymer melt is fed in through the sidearm and fills the empty space between the inner tube and the outer tube. The polymer melt continues to flow toward the effluent end of the inner tube until it contacts the effluent gas jet. The gas jet impinging on the melt surface creates a thin film of polymer melt, which travels to the effluent end of tube where it is ejected forming a turbulent cloud of nanofibers.

It should be noted that the present invention is not limited to just the combination of poly(amic acid) (PAA) films with polyethylene oxide (PEO) nanofibers. Rather, any combination of polymer film and nanofibers can be used so long as the film/nanofiber combination yields a combined structure having suitable strength and durability for the intended application. Other suitable polymers for use as film forming and/or fiber forming compounds include, but are not limited to nylons, polycaprolactones, etc. Also possible as fiber forming materials are metal organic precursors to ceramics, etc.

In still another embodiment, the present invention also permits the addition, sequestration or coating of the one or more nanofiber layers of the present invention with one or more chemical reagents, biological cells and organelles, biomolecules, and/or therapeutic substances.

In still another embodiment, the present invention can include one or more nanofiber layers where the nanofibers making up one or more of the nanofiber layers are beaded nanofibers (see FIG. 9). In this instance any portion of the nanofibers, or even all the nanofibers, are beaded. In another embodiment, some or all of the nanofibers contained within the structures of the present invention are coiled nanofibers.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A method for producing a nanofiber-polymer film combination, the method comprising the steps of:
   (A) solution casting a polymer film to provide a solution-cast polymer film, the solution-cast polymer film including solvent,
   (B) electrospinning nanofibers onto the solution-cast polymer film of step (A) before the evaporation of the solvent of the solution-cast polymer film to completely or partially embed one or more electorospun nanofibers into the solution-cast polymer film.

2. The method of claim 1, wherein the one or more nanofibers have an average diameter in the range of 3 nanometers to about 3,000 nanometers.

3. The method of claim 1, wherein the one or more nanofibers have an average diameter in the range of about 7 nanometers to about 1,000 nanometers.

4. The method of claim 1, wherein the one or more nanofibers have an average diameter in the range of about 10 nanometers to about 500 nanometers.

5. The method of claim 1, wherein the polymer film is formed from a poly(amic acid).

6. The method of claim 1, wherein the nanofibers are formed from any polymer compound that is electrospun.

7. The method of claim 6, wherein the nanofibers are formed from polyethylene oxide.

8. The method of claim 1, wherein the nanofibers are formed from any polymer compound that is subjected to a nanofiber by gas jet process.

9. The method of claim 1, wherein at least two nanofibers are completely or partially embedded into the solution-cast polymer film.

10. A method for producing a nanofiber-polymer film combination, the method comprising the steps of:
   (a) solution casting a polymer film to provide a solution-cast polymer film, the solution-cast polymer film including solvent;
   (b) subjecting the solution-cast polymer film to at least one heating zone; and thereafter
   (c) electrospinning nanofibers onto the solution cast polymer film of steps (a) and (b) before the evaporation of the solvent of the solution-cast polymer film to completely or partially embed one or more layers of nanofibers into the solution-cast polymer film.

11. The method of claim 10, wherein the one or more nanofibers have an average diameter in the range of 3 nanometers to about 3,000 nanometers.

12. The method of claim 10, wherein the one or more nanofibers have an average diameter in the range of about 7 nanometers to about 1,000 nanometers.

13. The method of claim 10, wherein the one or more nanofibers have an average diameter in the range of about 10 nanometers to about 500 nanometers.

14. The method of claim 10, wherein the polymer film is formed from a poly(amic acid).

15. The method of claim 10, wherein the nanofibers are formed from polyethylene oxide.

16. The method of claim 10, wherein at least two nanofibers are completely or partially embedded into the polymer film.

\* \* \* \* \*